Figure 1:
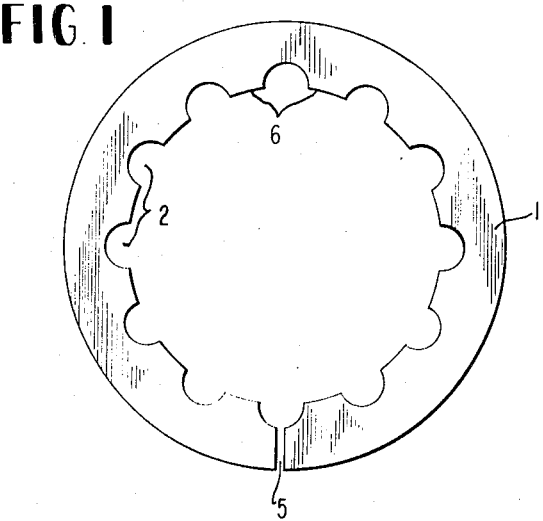

United States Patent

Hoffmann

[15] 3,656,770
[45] Apr. 18, 1972

[54] PISTON
[72] Inventor: Heinrich Hoffmann, Stuttgart-Geroksruhe, Germany
[73] Assignee: Daimler-Benz Aktiengesellschaft, Stuttgart-Unterturkheim, Germany
[22] Filed: Jan. 23, 1970
[21] Appl. No.: 5,286

[30] Foreign Application Priority Data
 Jan. 23, 1969 Germany..................P 19 03 257.6

[52] U.S. Cl..........................................277/189.5, 277/193
[51] Int. Cl...........................................F16j 9/22, F16j 9/00
[58] Field of Search.................277/189.5, 193, 188, 192, 197

[56] References Cited

UNITED STATES PATENTS 2,996,342   8/1961   Daub..................................277/189.5
2,415,984   2/1947   Ballard..................................277/188

Primary Examiner—Samuel B. Rothberg
Attorney—Craig, Antonelli & Hill

[57] ABSTRACT

A piston in which the piston ring arranged in the groove following the piston top land is securely supported by a piston ring support that consists of an annular disc retained under stress with its inner circumference at the piston, and more particularly between the upper edge of the piston ring groove and the piston ring itself.

7 Claims, 2 Drawing Figures

PATENTED APR 18 1972 3,656,770

INVENTOR
HEINRICH HOFFMANN

BY
Craig, Antonelli, Stewart & Hill
ATTORNEYS

3,656,770

PISTON

The present invention relates to a piston in which a piston ring essentially rectangular in cross-section with a piston ring support is arranged in the piston ring groove following the piston top land.

The present invention aims at preventing far-reachingly the predominant wear of the upper groove flank and therewith to avoid an enlargement of the play in the axial direction. As a result thereof, an increase of the oil consumption and of the piston blow or piston-ring blow-by quantity is no longer possible.

This is achieved according to the present invention in that the piston ring support consists of a wear-resistant annular disc which is retained under stress with its inner circumference at the piston between the upper rim of the piston ring groove and the piston ring.

It is thereby to be considered as advantageous that the piston ring receives by means of the piston ring support a strong, rigid and mechanically reinforced support in the piston ring groove, and that an axial play is almost not present at all, i.e., is practically absent.

In a preferred type of construction according to the present invention, a second groove may be provided for the piston ring support which starts from the groove bottom of the piston ring groove. In this manner, the piston ring support is fixed in the axial direction.

According to a further feature of the present invention, the piston ring support may be provided at its inner circumference with preferably semi-circularly shaped recesses. For the purpose of slipping the piston ring support over the top land of the piston, a bending apart of the piston ring support under stress is made possible thereby.

Additionally, the present invention proposes that the piston ring support abuts only with the web portions between the recesses. Furthermore, the outer diameter of the piston ring support may be smaller than the piston diameter in order to avoid under all circumstances a contact with the cylinder wall.

Accordingly, it is an object of the present invention to provide a piston which avoids by simple means the aforementioned shortcomings and drawbacks encountered in the prior art.

Another object of the present invention resides in a piston which precludes far-reachingly the wear of the upper groove flank and thus eliminates an increase in play in the axial direction on the part of the piston ring.

A further object of the present invention resides in a piston which effectively minimizes the danger of increase in the oil consumption and piston blow quantity.

Still a further object of the present invention resides in a piston for an internal combustion engine in which the piston ring is secured more rigidly in the piston ring groove.

Figure 2:
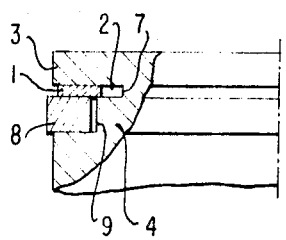

These and further objects, features, and advantages of the present invention will become more obvious from the following description when taken in connection with the accompanying drawing which shows, for purposes of illustration only, one embodiment in accordance with the present invention, and wherein:

FIG. 1 is a top plan view on a piston ring support in accordance with the present invention; and FIG. 2 is a partial cross-sectional view through a piston with a piston ring and a piston ring support in accordance with the present invention.

Referring now to the drawing wherein like reference numerals are used throughout the two views to designate like parts, and more particularly to FIG. 1, semi-circularly shaped recesses 2 are regularly distributed along the inner circumference of the piston ring support 1 consisting of steel. The slipping over of the piston ring support 1 over the top land 3 of the piston 4 is made possible by the accommodation of a slot 5. The piston ring support 1 is seated — as can be seen from FIG. 2 — with the web portions 6 in the groove 7 above the piston ring 8 disposed in the piston ring groove 9. The outer diameter of the piston ring support 1 is smaller than the diameter of the piston 4.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are within the scope of those skilled in the art.

I claim:

1. A piston in which a piston ring with a piston ring support is arranged in the piston ring groove following the piston top land, characterized in that the piston ring support consists of an annular disc which is provided with alternate web portions and recesses along its internal circumference and is retained under stress with its internal circumference retained in the piston only at the web portions thereof between the recesses between the upper edge of the piston ring groove and the upper surface of a second groove adjacent said piston ring groove and extending inward therefrom.

2. A piston according to claim 1, characterized in that the piston ring support is of essentially rectangular cross-section.

3. A piston according to claim 1, characterized in that the piston ring support is provided with a slot between its inner circumference and its outer circumference.

4. A piston according to claim 2, characterized in that said recesses are of substantially semi-circular shape.

5. A piston according to claim 4, characterized in that the outer diameter of the piston ring support is smaller than the diameter of the piston.

6. A piston according to claim 1, characterized in that said recesses are of substantially semi-circular shape.

7. A piston according to claim 1, characterized in that the outer diameter of the piston ring support is smaller than the diameter of the piston.

* * * * *